(12) United States Patent
Frieden

(10) Patent No.: US 9,854,784 B2
(45) Date of Patent: Jan. 2, 2018

(54) FEEDER SYSTEM

(71) Applicant: Garrett Blake Frieden, Lamar, MO (US)

(72) Inventor: Garrett Blake Frieden, Lamar, MO (US)

(73) Assignee: Garrett B. Frieden, Lamar, MO (US)

(*) Notice: Subject to any disclaimer, the term of this patent is extended or adjusted under 35 U.S.C. 154(b) by 179 days.

(21) Appl. No.: 14/690,560

(22) Filed: Apr. 20, 2015

(65) Prior Publication Data

US 2016/0302383 A1 Oct. 20, 2016

(51) Int. Cl.
A01K 5/02 (2006.01)
A01M 31/00 (2006.01)

(52) U.S. Cl.
CPC ............ *A01K 5/02* (2013.01); *A01M 31/004* (2013.01)

(58) Field of Classification Search
CPC ........ A01K 5/02; A01K 5/001; A01K 5/0225; A01K 5/0258; A01K 5/0291; A01M 31/004
USPC ....................................... 119/57.91
See application file for complete search history.

(56) References Cited

U.S. PATENT DOCUMENTS

| | | | | |
|---|---|---|---|---|
| 1,021,209 | A | * | 3/1912 | Platt ............. A01K 5/0114 119/51.5 |
| 5,143,289 | A | * | 9/1992 | Gresham ........... A01K 5/0291 119/51.11 |
| 6,889,630 | B1 | | 5/2005 | Wayman |
| 6,920,841 | B2 | | 7/2005 | Meritt |
| 7,017,521 | B2 | | 3/2006 | Kuelbs |
| 7,370,605 | B2 | | 5/2008 | Meritt |
| D575,908 | S | | 8/2008 | Meritt |
| D599,503 | S | | 9/2009 | Meritt |
| D602,649 | S | | 10/2009 | Meritt |
| D603,104 | S | | 10/2009 | Meritt |
| D603,105 | S | | 10/2009 | Meritt |
| D603,566 | S | | 11/2009 | Meritt |
| D604,017 | S | | 11/2009 | Meritt |
| D622,453 | S | | 8/2010 | Meritt |
| D624,706 | S | | 9/2010 | Meritt |
| D624,707 | S | | 9/2010 | Meritt |
| D624,708 | S | | 9/2010 | Meritt |
| D624,709 | S | | 9/2010 | Meritt |
| D629,572 | S | | 12/2010 | Meritt |
| D629,976 | S | | 12/2010 | Meritt |

(Continued)

FOREIGN PATENT DOCUMENTS

EP 2109357 A1 10/2009
WO 02076191 10/2002

*Primary Examiner* — Monica Williams
(74) *Attorney, Agent, or Firm* — Wood Herron & Evans LLP

(57) ABSTRACT

An animal feeder system for dispensing feed onto a ground surface, including a tank configured for holding feed and having a bottom end for receiving a gravity flow of feed in the tank. A spreader mechanism is operably coupled with the bottom end of the tank, and is operable to receive a flow of feed from the bottom end of the tank and periodically dispense the feed onto a ground surface proximate the tank. A bulk dump system includes a discharge port positioned in the tank and configured for capturing feed in the gravity flow, and a feed valve coupled with the discharge port and selectively operable for dispensing the captured feed from the discharge port into a pile on the ground surface.

19 Claims, 16 Drawing Sheets

(56) References Cited

U.S. PATENT DOCUMENTS

| | | |
|---|---|---|
| D630,653 S | 1/2011 | Meritt |
| D630,802 S | 1/2011 | Meritt |
| D636,942 S | 4/2011 | Meritt |
| 8,555,812 B2 | 10/2013 | Nowacek |
| 8,651,053 B2 | 2/2014 | Reid |
| 2007/0137584 A1 | 6/2007 | Travis |
| 2008/0202435 A1 | 8/2008 | Nowacek |
| 2009/0020073 A1 | 1/2009 | Hansen |
| 2010/0162960 A1 | 7/2010 | Moon |
| 2010/0307421 A1* | 12/2010 | Gates .................. A01K 5/0225 119/56.1 |
| 2013/0036978 A1 | 2/2013 | Morris et al. |
| 2013/0186342 A1 | 7/2013 | Salinas et al. |
| 2014/0116343 A1 | 5/2014 | Collins |
| 2014/0131468 A1 | 5/2014 | Meritt |

\* cited by examiner

FEEDER SYSTEM

FIELD OF THE INVENTION

The present invention is directed generally to supplemental feeding of game, such as deer, turkey, fish, hogs, etc., and specifically to a system for doing so.

BACKGROUND OF THE INVENTION

Various devices and systems are known for providing supplemental feed to wild game, such as deer, turkeys, etc. Such feeding can be used, for example, to assist the health and well-being of the animals, and also as part of an efficient hunting strategy. Generally, such devices involved the use of a hopper, or other reservoir, which gravity-feeds the food, such as grain, to a spreader mechanism. For example, many such systems incorporate rotating spreaders that throw the feed generally around the circumference of the hopper of the feeder device.

Basic feeder devices incorporate a hopper full of feed, and a spreader mechanism located on the bottom of the hopper that operates on a timer to throw a certain amount of feed out of the hopper at periodic times. The feed then hits a ground surface, and animals eat it from the ground. Other systems, do not incorporate a spreader, but may simply direct the feed to a trough or other opening to be accessed directly by the animal from the device. In such a case, the animal generally puts its mouth to the trough and feeds, rather than picking up feed that has been spread on the ground. Such devices generally direct additional feed to the trough by gravity only once an animal has removed a certain amount of feed from the trough, or opening, so that feed from the hopper does not spill onto the ground.

While many such devices are adequate in providing a general periodic feeding to various animals, there is still need to improve upon their operation and usage, such as to address the different feeding patterns and habits of animals throughout the fall and winter seasons, such as a hunting season. Furthermore, there is still a need for improvements to such systems to better assist a user, such as a hunter, in their quest to efficiently harvest game animals. Still further, there is a need to improve the placement features and overall use features of such devices to accommodate various different locations and installation scenarios from the feeder device. Accordingly, the present invention addresses the need in the art to improve upon current feeder devices and systems.

BRIEF DESCRIPTION OF THE DRAWINGS

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The accompanying drawings, which are incorporated in and constitute a part of this Specification, illustrate embodiments of the invention and, together with a general description of the invention given below, serve to explain the principles of the invention.

DETAILED DESCRIPTION OF THE DRAWINGS

Figure 1:
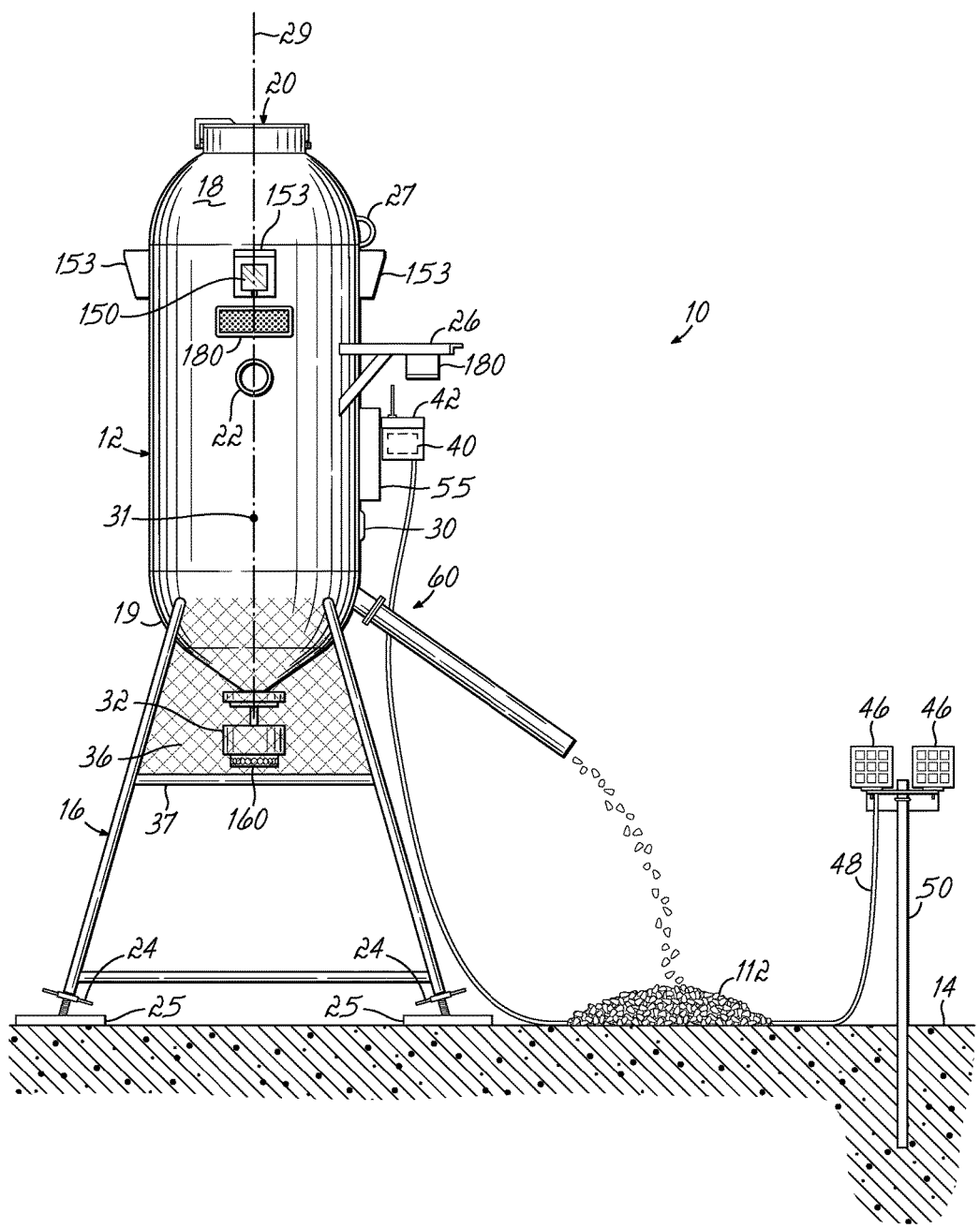
FIG. 1 is a side view of an embodiment of the feeder system of the invention.

FIG. 1 illustrates one side view of a feeder system or device 10 in accordance with aspects of the present invention. Feeder system 10 includes a reservoir or tank 12 that is supported above a ground surface 14 by a suitable frame structure 16. The frame structure may be welded, bolted, or otherwise attached to tank 12, as appropriate to support the tank. The tank 12 maybe made of a suitable material, such as metal or plastic. In one embodiment invention, tank 12 is a 500 gallon propane tank made of 3/16 inch and 1/4 inch steel, which is oriented vertically to have top and bottom ends. The top end 18 is fitted with a suitable lid structure 20 that may be opened to load the tank 12 with feed, and then closed and sealed to protect the feed from the environment. Suitable latches or other structures may lock the lid structure 20 in place to prevent animals from accessing the inside of the tank, or to otherwise prevent tampering with the contents of the tank. Suitable feed for the feeder system 10 might include a grain, such as loose corn kernels that may flow by gravity to the bottom 19 of the tank and to various outlets of the system 10.

Figure 2:
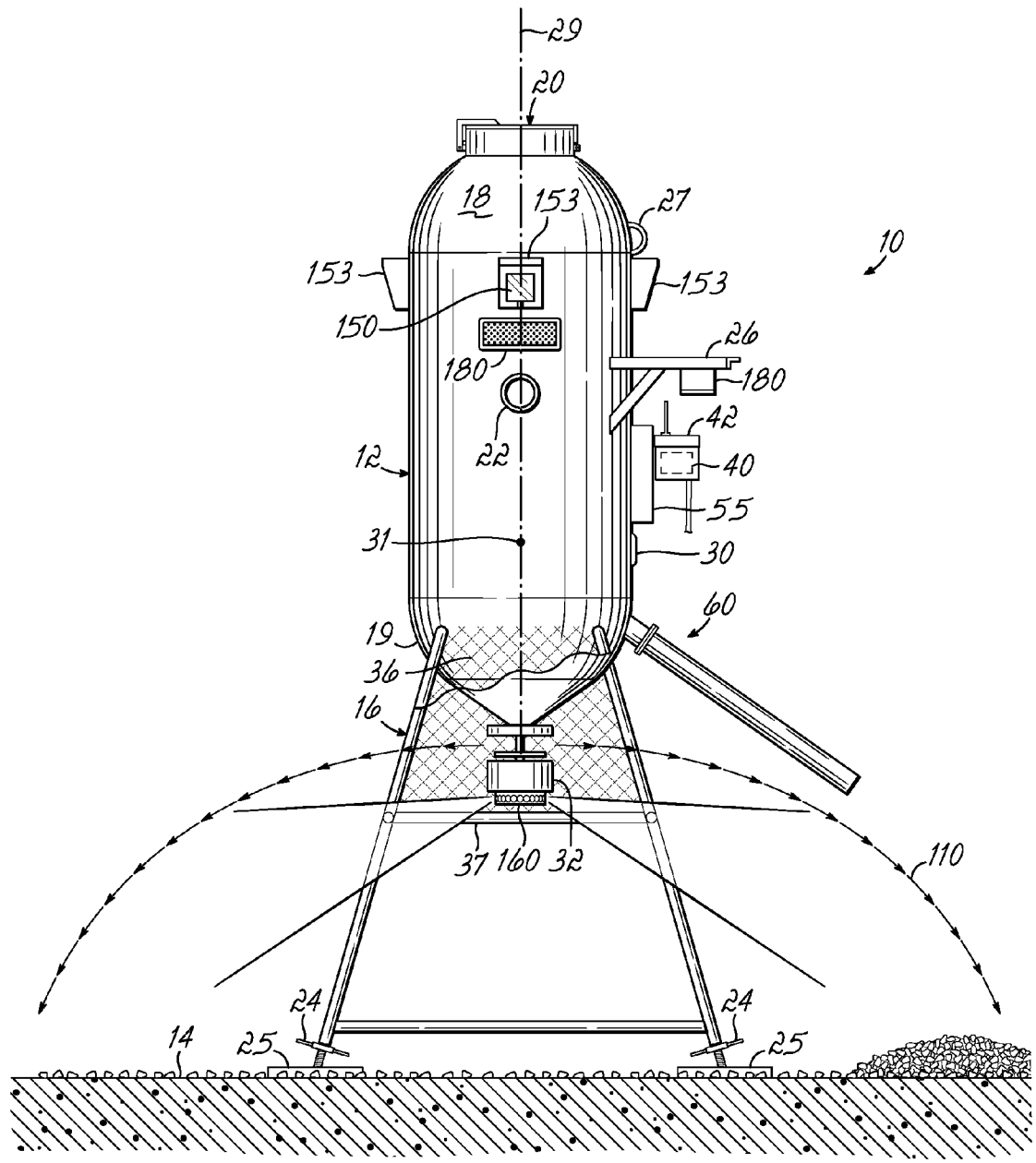
FIG. 2 is another side view of an embodiment of the feeder system of the invention.

In using system 10, the system will be appropriately positioned where animals may access the feed dispensed in accordance with the invention. To that end, the system 10 may be moved to a field, a wooded area, the transition area between woods and a field, or any other appropriate area that wild game may frequent. As may be appreciated, in one embodiment of the invention utilizing a 500 gallon metal tank, the overall system 10 is significantly heavy as to require the use of equipment for movement and placement of the system. To that end, in accordance with one aspect of the invention, a lifting structure 22 is implemented on the tank. In accordance with one embodiment the invention, the lifting structure is in the form of a tubular structure, such as a metal tube, that extends through tank 12, from one side to the other, as shown in the figures. The tube or tubular structure 22 may be welded, bolted, or otherwise attached to the tank 12. The tubular structure 22 is oriented and positioned with respect to tank 12 to be engaged by a lifting apparatus. In one embodiment, the lifting structure is positioned along a longitudinal centerline 29 as illustrated in FIGS. 1 and 2. The lifting structure is also positioned above the center of gravity for the tank, which is defined in FIGS. 1 and 2 by reference numeral 31. The center of gravity may be located at various points and so the invention is not limited to a particular location for that point. But the lifting structure is positioned above that point 31 as discussed below. For example, the lifting structure allows lifting equipment, such as the forks of a forklift, or the spikes of a hay bale spike/lifter to be inserted in the tubular structures for lifting the feeder system 10, and moving it to the position where it would be utilized. By positioning the lifting structure above the center of gravity and along the longitudinal centerline, the system 10 might be lifted and would not have a tendency to swing significantly from side to side on the lifting equipment. In that way, the system might be moved into position without significant risk of swinging and damaging the lifting equipment or requiring significant adjusting to set it down in the desired position. The lifting structure ensures that the system is balanced when suspended for being moved into location. The tube lifting structure is shown as a cylindrical tube or pipe, but rectangular or other tubes or pipes might also be used. Once positioned, the frame 16 incorporates leveling feet 24 that engage the ground surface 14, and may be adjusted to level the tank and other elements of system 10 for proper operation. In one embodiment of the invention, the leveling feet 24 might include screw jacks that may be appropriately rotated to extend or retract the length of the feet. Large bearing plates, such as 24 inch×24 inch by ¾ inch bearing plates 25 might be implemented so the feeder system does not settle into the ground, as shown in the figures.

To assist in loading the tank 12 with suitable feed, a work platform 26 is attached to the tank 12 to provide a platform for standing, sitting, or kneeling in order to direct feed into tank 12. For example, bags of corn might be emptied into tank 12, or grain might be directed from a cart, through a conveyor system, into tank 12. The work platform 26 facilitates such loading operation. For safety purposes, feeder system 10 incorporates a tie-off structure 27 positioned above the work platform 26. The users of the feeder system 10 may anchor or tie themselves off appropriately on the elevated work platform to prevent a fall. In that way, the work platform 26 may be safely used, such as to fill tank 12. To determine the amount of feed remaining in tank 12, a sight window 30 is implemented at certain levels in the tank. (See FIG. 2). For example, as discussed further herein, the sight window might be located close to the bottom of tank 12, and also close to an inlet end of a bulk discharge port, so that a user may see that feed is getting close to the bottom of the tank and/or getting to a position where the feed can no longer supply the bulk discharge port as discussed herein. Sight window 30 may be made of an appropriate transparent material, such as glass or plastic.

In accordance with one aspect the invention, system 10 incorporates a spreader mechanism that is operably coupled with an open bottom end 19 of tank 12. Specifically, the spreader mechanism 32, in the form of a spreader box, as shown in the figures, is gravity fed with feed from tank 12, as is known in the art. Such spreaders generally include a rotating plate that is rotated by a motor, to centrifugally throw feed that drops onto the plate around the circumference of the spreader mechanism 32. In that way, as seen in FIG. 2, feed is scattered, in generally a circular pattern around system 10 so that animals, such as deer or turkey, may feed all around the system. Such spreader mechanisms are commercially available, and may be coupled to a reservoir, such as tank 12, for receiving feed to be spread. One suitable commercially available spreader mechanism is the "EZ" Digital Spinner Unit, available from Spin Tech Feeders of San Antonio, Tex. Another unit might be a Boss Buck Spreader, available from Boss Buck, Inc. of Seagoville, Tex.

Figure 8:
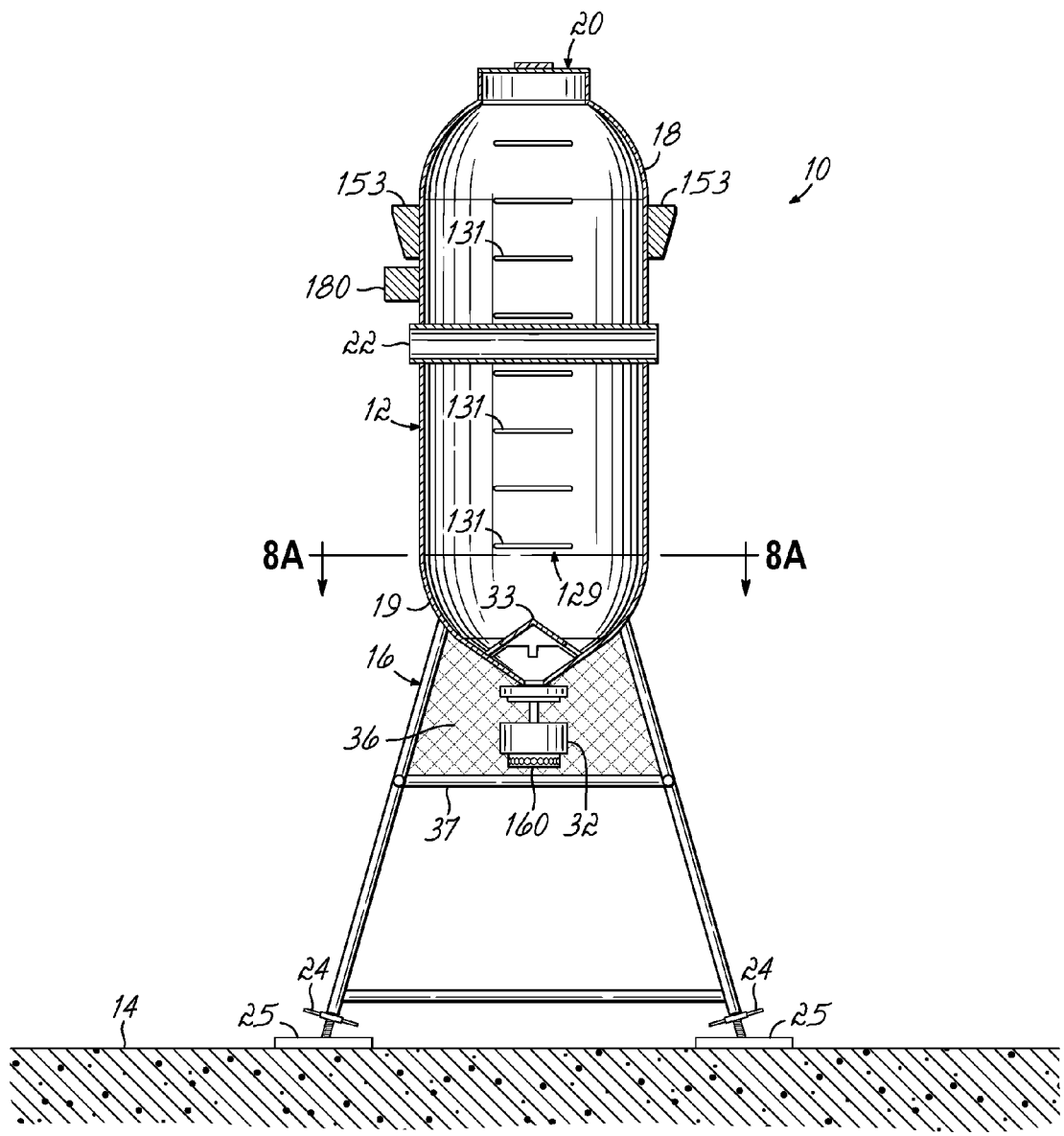
FIG. 8 is a view of another embodiment of the feeder system of the invention.
Figure 8A:
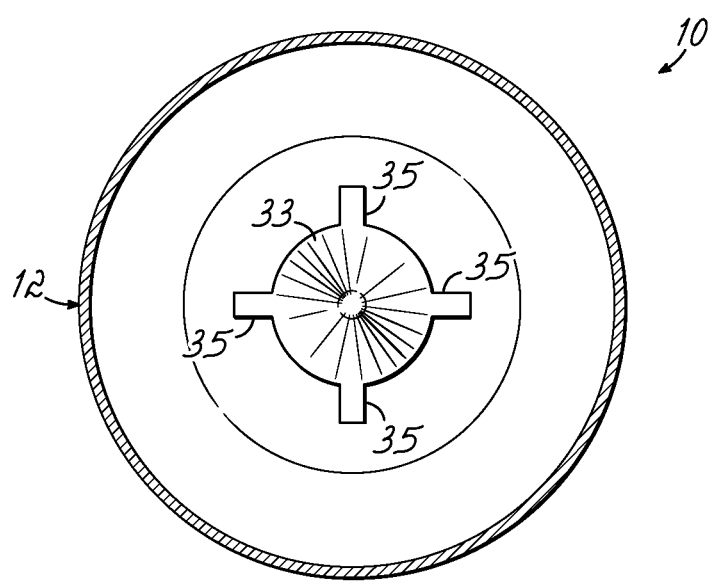
FIG. 8A is a cross-sectional view taken along line 8A-8A of FIG. 8 illustrating a spreader baffle.

Because of the size of the tank 12 and the significant amount feed that may be stored in accordance with the invention, a significant amount of weight might be placed upon the spreader mechanism 32. In accordance with another aspect of the invention, as illustrated in FIGS. 8 and 8A, the feeder system 10 incorporates an internal baffle proximate the bottom end 19 of the tank 12. The baffle intercepts the feed and diverts the feed flow from flowing directly onto the spreader mechanism. Particularly, the weight of the feed, such as corn, is kept from being directed straight down and directly onto the spreader mechanism. Some spreader mechanisms incorporate spring-loaded spreaders. As illustrated in FIG. 8, baffle 33, as positioned in tank 12, generally aligns over the top of the spreader mechanism 32. Referring to FIG. 8A, the baffle 33 might be supported by one or more legs 35 to keep it in the proper position. Baffle 33 may be made of a suitable material, such as steel, and might be welded to the legs 35, which are in turn, welded to the inside of tank 12. Other ways of securing baffle 33 inside tank 12 might also be utilized. Using the baffle, the feed is then generally directed outwardly, from the center of the tank around to the peripheral edges, thus, preventing direct weight onto the spreader mechanism, including any spring mechanisms associated therewith.

To prevent access to spreader mechanism 32 and the bottom end of tank 12 by undesirable wild animals, such as raccoons, squirrels, bears etc., a fencing, or mesh 36, is coupled to the frame 16, around the bottom end 19 of the tank and the spreader mechanism 32, as illustrated in the figures. The fencing or mesh may be made of a suitable metal material for strength, and may be welded, bolted, strapped, or otherwise attached to the frame 16 and/or tank 12 to encase and enclose spreader mechanism 32. The fence/mesh material has a sufficiently open pattern that may prevent undesirable animals from accessing spreader mechanism 32, while still allowing the feed to sufficiently pass through the pattern to allow the feed to be spread appropriately around the feeder system 10 (See FIG. 2). The fence/mesh material might also be implemented directly below the bottom of the spreader mechanism 32 as a floor, such as at crossbar 37, to form a mesh floor (not shown) to prevent access to spreader mechanism 32 from below. In that way, the spreader mechanism 32 is suitably protected.

Spreader mechanism 32 generally incorporates a motor for providing rotational movement of spreader components. The motor is powered by an appropriate power supply, that may include a battery 40 shown encased within housing 42, and appropriately secured to the side of tank 12 (See FIG. 1). While the housing 42 and battery 40 are illustrated positioned generally toward the middle of the tank, their placement may be anywhere appropriate on the tank. Battery 40 is appropriately electrically connected by suitable wires or cables (not shown) to power the spreader mechanism 32. The power source, such as battery 40, might be removable from housing 42, and rechargeable and then replaced. Alternatively, the battery 40 may be replenished utilizing solar power.

To that end, battery 40 might be appropriately coupled with one or more solar elements, such as solar panels 46, as illustrated in the figures. Conventionally, solar panels are often placed on the feeder, such as on the top of the side of the feeder, for capturing sunlight for conversion to electrical energy. Such panels on the feeder are fine if the feeder device 10 is positioned out in an open space, and can receive sunlight from various different directions and from above to be appropriately captured by one or more panels 46. However, often it is desirable place a feeder system where animals move, such as in a wooded area, where it is covered from the sides and above by leaves and other foliage. Alternatively, the feeder system 10 might be positioned at a transition area between a field and a wooded area, but close enough to the wooded area that sunlight is obstructed significantly from half of the feeder system, and possibly from above.

In accordance with one aspect of the invention, feeder system 10 incorporates suitable structures for positioning solar panels 46 remotely from tank 12, to put them in a better position to capture available sunlight. Referring to FIG. 1, one or more solar panels 46 might be appropriately coupled with battery 40 by an electrical cable 48 of appropriate length to allow the solar panels 46 to be positioned away from the tank 12. In such an embodiment, solar panels 46 might be mounted on an appropriate mast or pole, or other mount 50, and positioned in an open area, or clearing, away from the system 10, and an obstructed wooded area, to capture available sunlight and appropriately power and recharge battery 40. The remote mounting of the solar panels 46 away from the tank 12 allows the system 10 to be best positioned where animals are located, but still allow panels to be appropriately oriented and positioned to capture available sunlight in the most efficient manner. This provides greater flexibility in using and positioning the system. The cable 28 is appropriately constructed so as to be armored to prevent damage from animals, such as squirrels.

Figure 4:
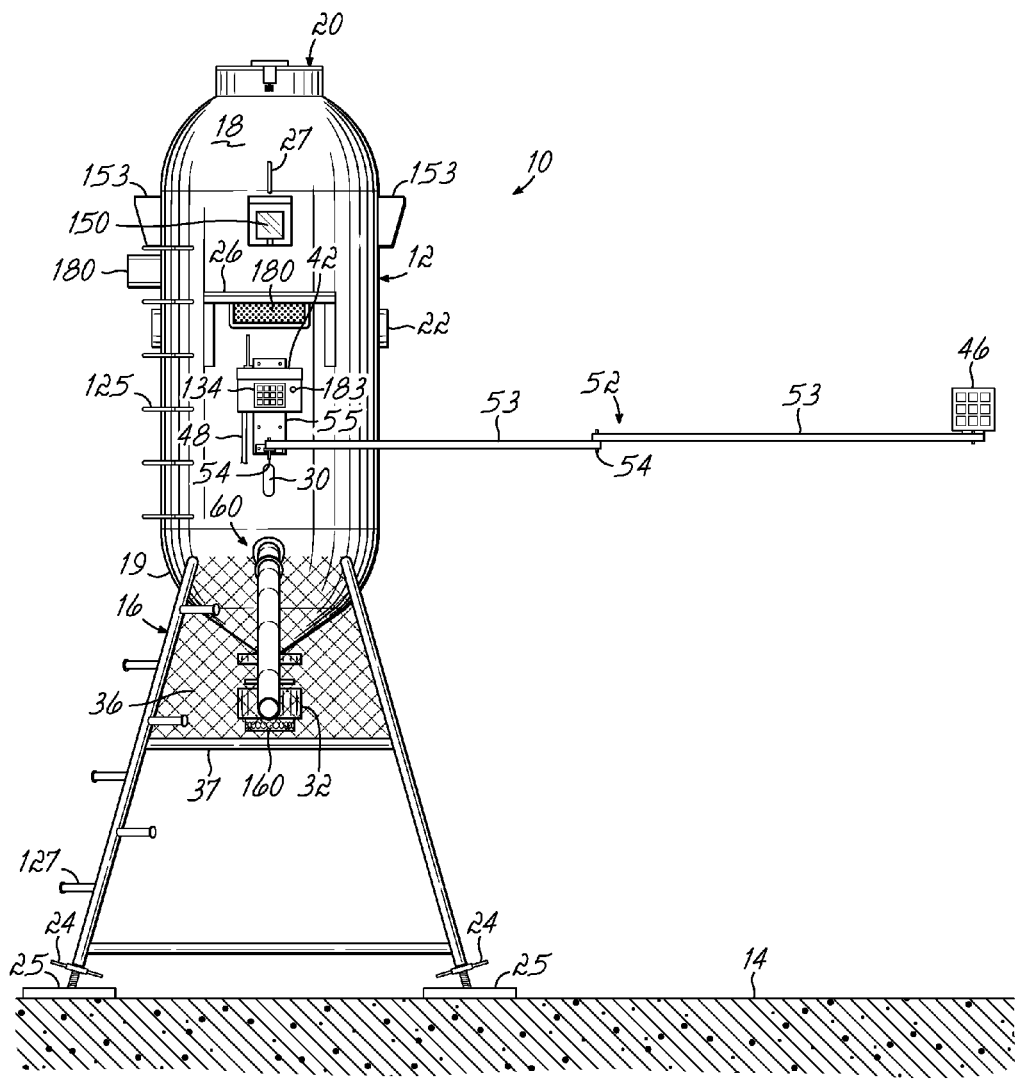
FIG. 4 is a front view of another embodiment of the feeder system of the invention.

In accordance with another embodiment of the invention, as illustrated in FIG. 4, an extendable arm 52 might be utilized to mount the solar panel 46 remotely from tank 12. Extendable arm 52 may be an articulating arm that incorporates multiple hinged elements 53 that may hinge at one or more hinge points 54 for extending the length of arm 52, or for otherwise positioning and angling the solar panel 46 for efficient capturing of sunlight. While the extendable arm shows two hinged elements 53, a greater number of elements might also be utilized. The arm 52 is also pivotally mounted with respect to an appropriate mounting bracket 55, so that the arm may be configured in various different ways to move solar panel 46 away from, or around the tank, as desired. Solar panel 46 is appropriately coupled by an electrical cable or wire (not shown) along the extendable arm 52 for powering battery 40.

Figure 7:
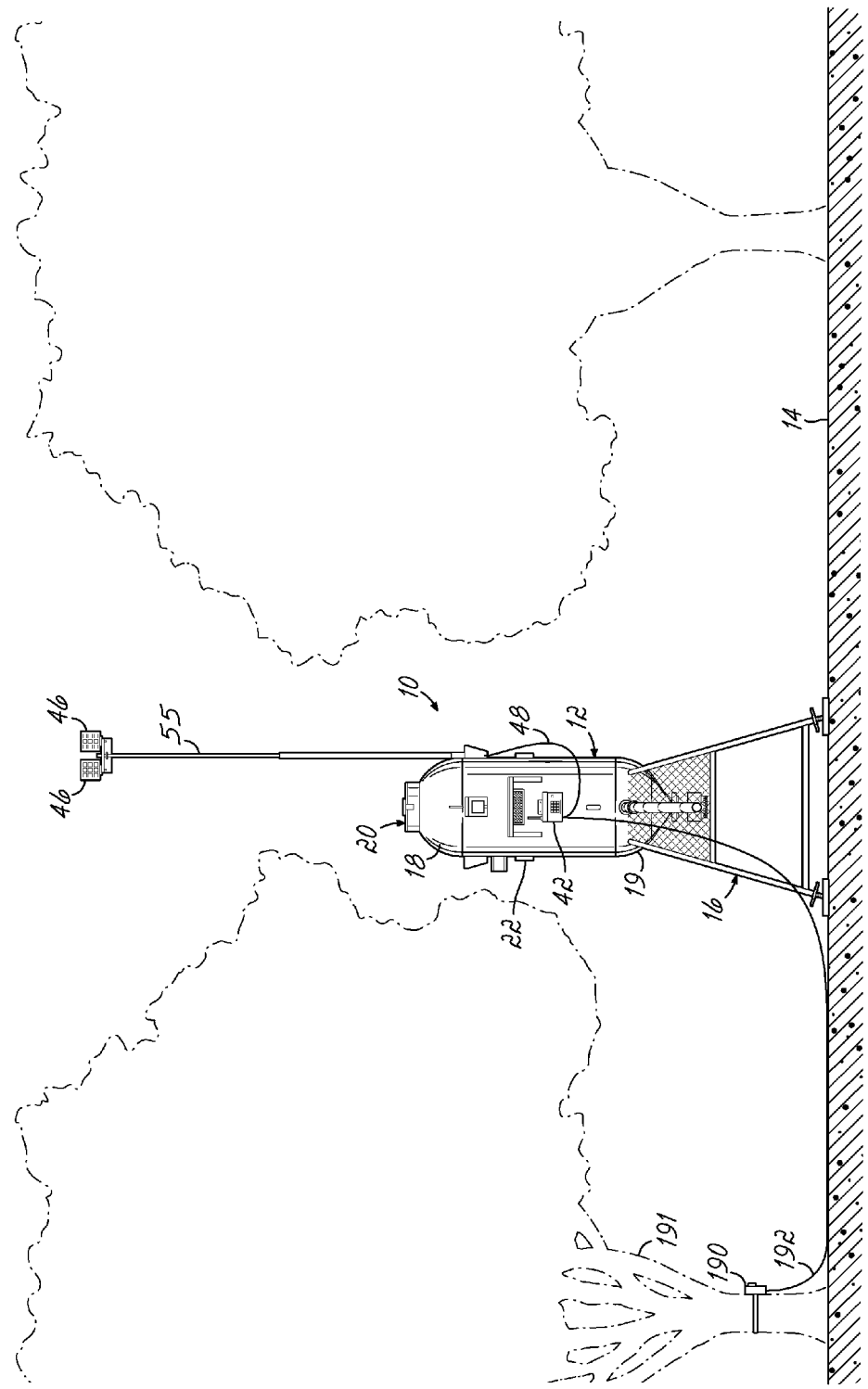
FIG. 7 is a view of another embodiment of the feeder system of the invention.

FIG. 7 illustrates an alternative embodiment utilizing a telescoping extendable arm 55 that may be appropriately coupled to tank 12. The telescoping arm 55 might be extended in height above the tank to provide access to unrestricted sunlight, such as within a tree canopy of a forest.

Still further, arm 52 might have other constructions that allow it to extend and position the solar panel 46, as desired. Thus, the specific configuration of the extendable arm is not limited by the drawings that may include any appropriate structure for positioning one or more solar panels 46 remotely from tank 12, and at various positions around the tank to capture sunlight.

Referring to FIG. 4, feeder system 10 may incorporate an external climbing or ladder system 125, with individual rungs or steps 127 that are incorporated into the frame structure 16 or actual tank 12, as shown in FIG. 4. The climbing system allows access to various portions of the system 10, including the top end 18 of the tank, such as for loading the tank with feed. Access is also provided to the control electronics within housing 42, as well as user interface 134, or other components of the system 10 that might not be reachable from the ground level.

For access into the internal portion of the tank, as illustrated in the cross-section figure of FIG. 8, an internal climbing system 129, with suitable steps or rungs, might also be utilized, such as to work inside the tank, such as for cleaning, clearing feed, or otherwise maintaining the feeder system 10.

Figure 4A:
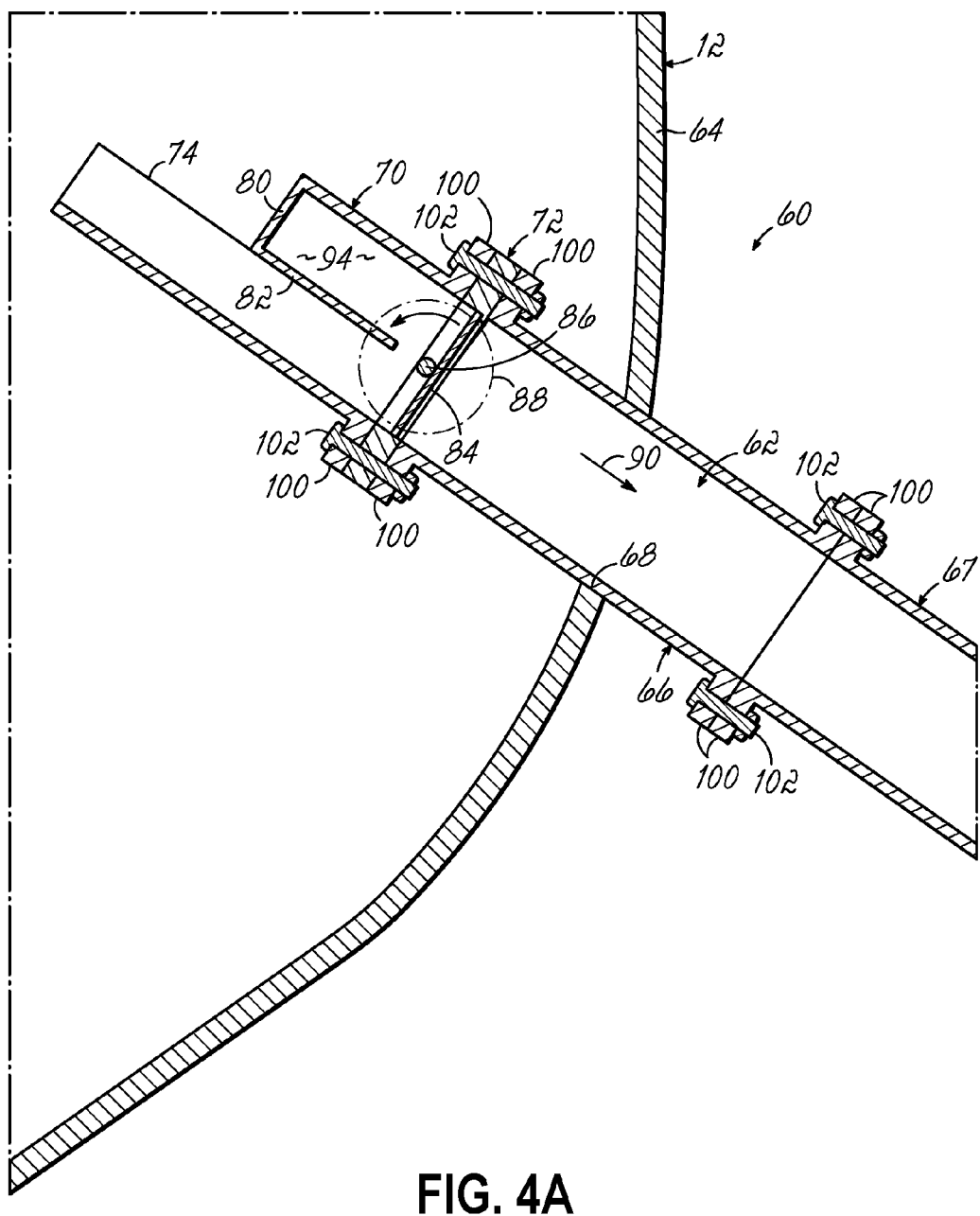
FIG. 4A is a partial cross-sectional view of an embodiment of a feeder system of the invention showing a discharge port.
Figure 4B:
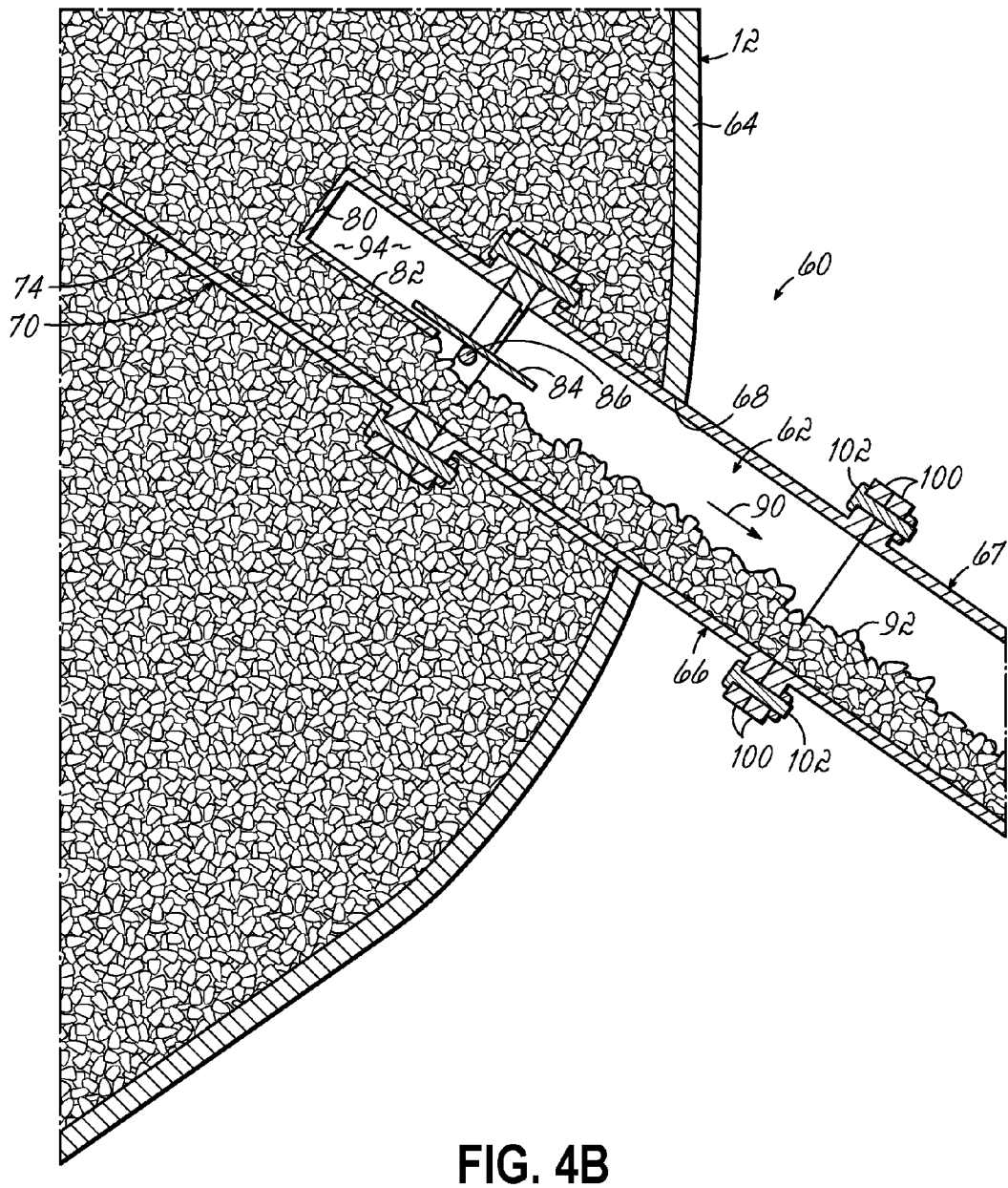
FIG. 4B is a cross-sectional view of a feeder system of the invention showing an open valve and a flow of feed.
Figure 4C:
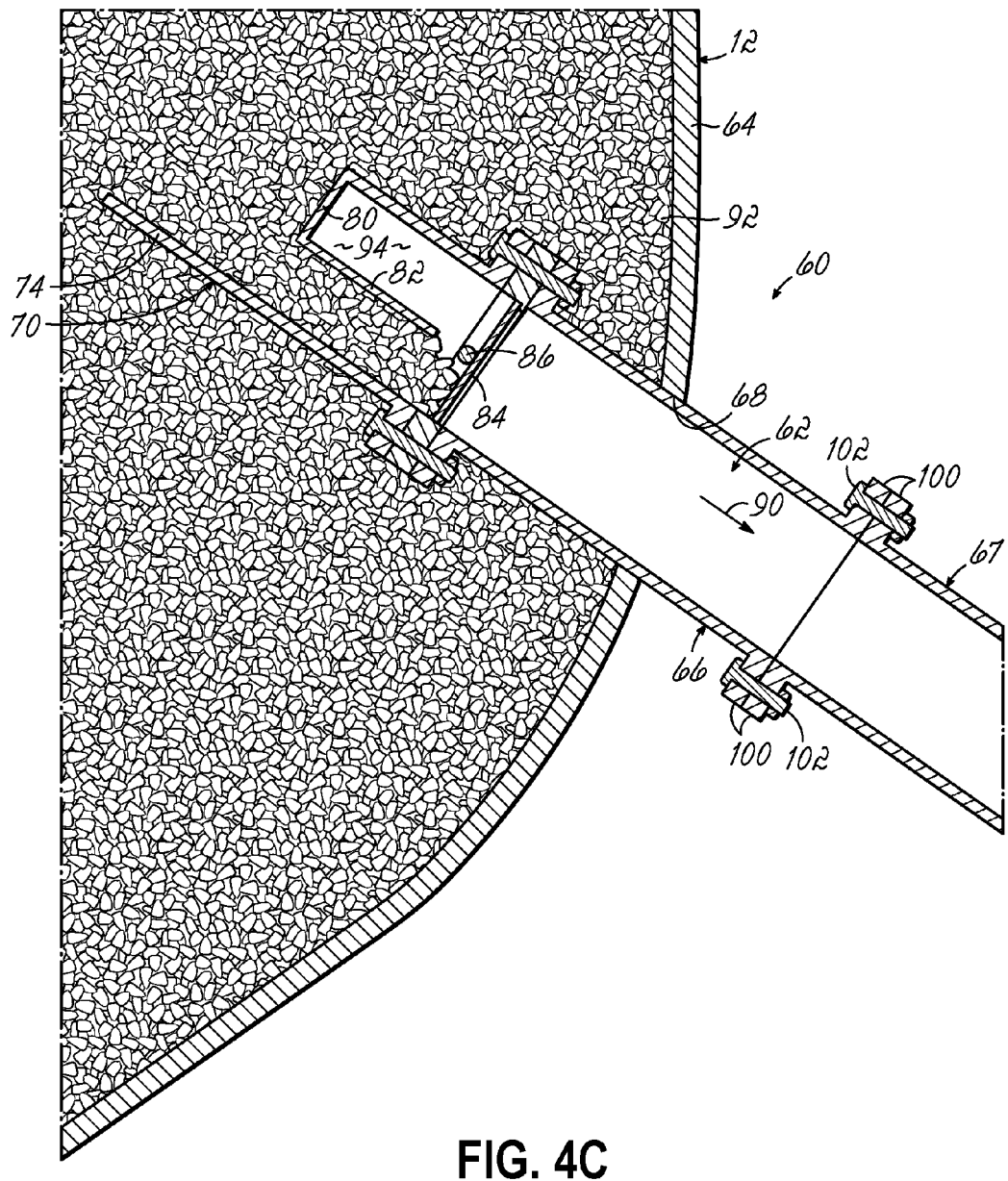
FIG. 4C is a cross-sectional view of an embodiment of a feeder system of the invention showing a valve closed stopping the flow of feed.
Figure 4D:
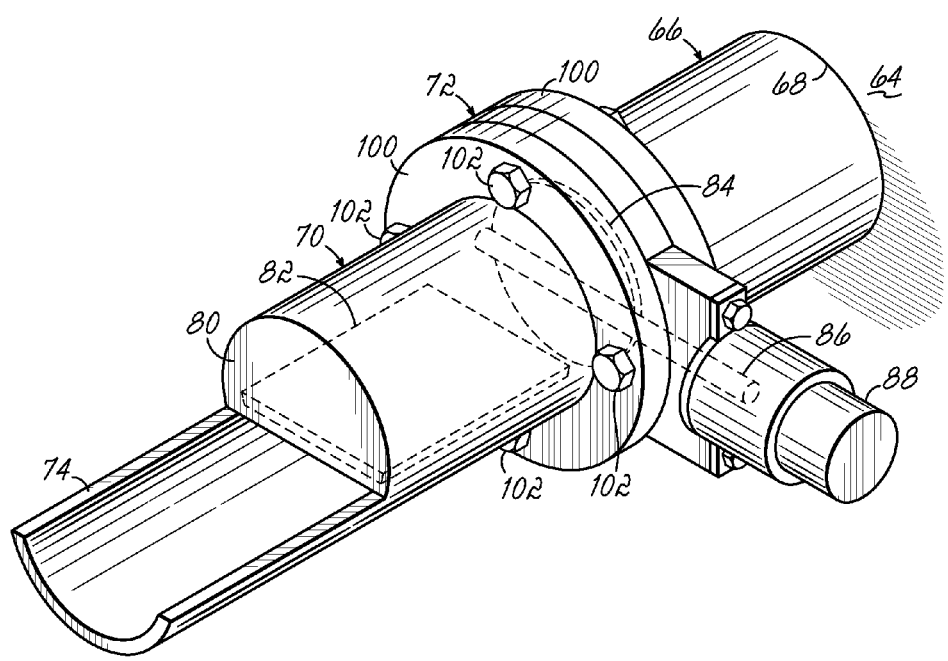
FIG. 4D is a perspective view of a valve for controlling feed flow, in accordance with one aspect of the invention.
Figure 5:
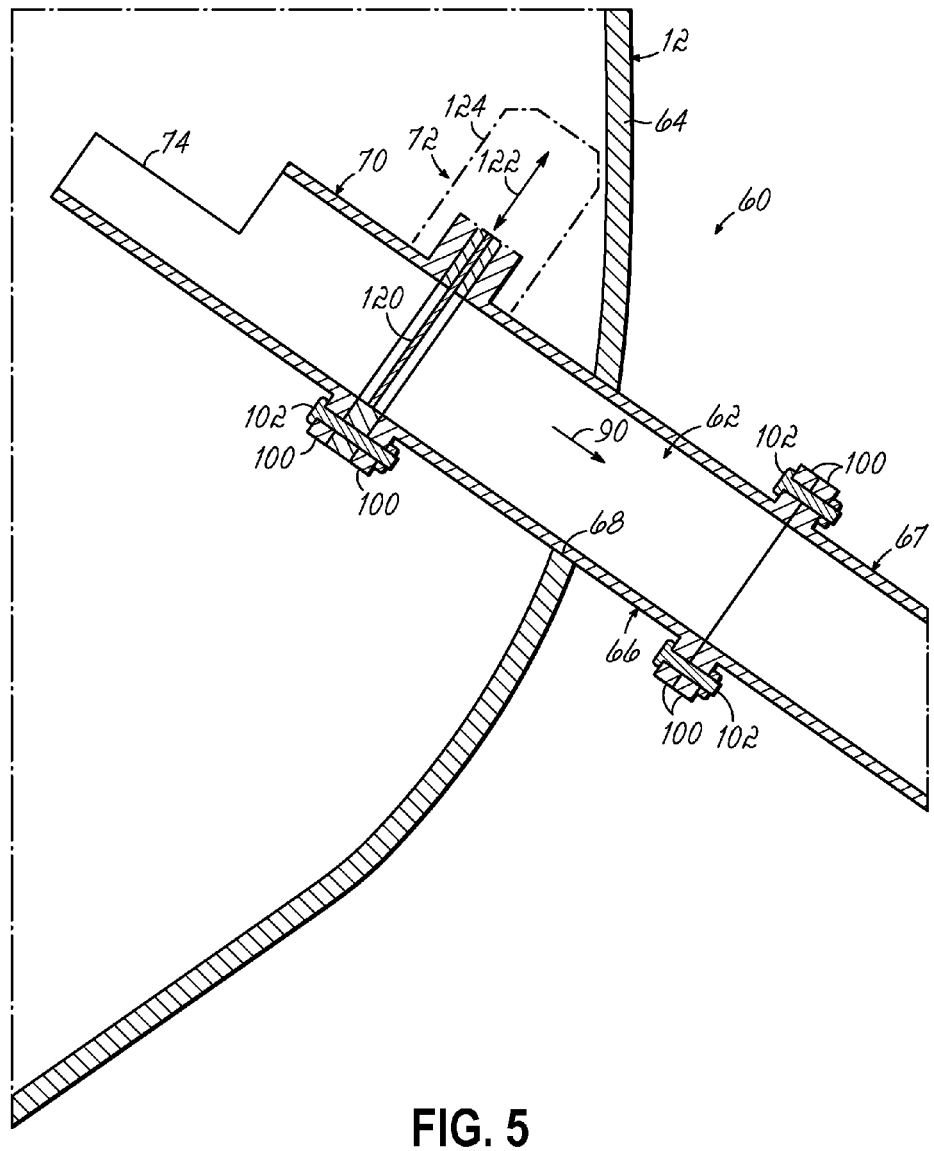
FIG. 5 is a cross-sectional view of another embodiment of the invention illustrating a discharge port.

In accordance with another feature of the invention, the feeder system 10 incorporates a bulk dump system for dumping feed in bulk into a pile at selective times. The bulk dumping might be accomplished under the remote control of a user of the system, or handled through manual controls, such as on a user interface, as discussed herein. Referring to FIG. 1, and FIGS. 4A-4D, one embodiment of a bulk dump system 60 for system 10 is illustrated. FIG. 5 illustrates another embodiment. Referring to FIG. 4A, the bulk dump system 60 incorporates a bulk discharge port 62 in tank 12. The bulk discharge port 62 illustrated is formed in a wall 64 of tank 12. In the embodiment illustrated in the figures, the bulk discharge port 62 is formed by a port pipe section 66, extending through an aperture, or opening 68, formed in the wall 64 of the tank. For example, the port pipe section 66 might be welded into the aperture 68. The bulk discharge port further includes a baffle section 70 for controlling the flow of the feed out of the port 62. The baffle section is coupled to the port pipe section 66 inside of the tank. The baffle section 70 is configured with a feed valve 72, such as a butterfly valve. Baffle section 70 includes an extended trough or trough portion 74 that extends upwardly into the tank 12 to capture feed that is gravity fed from within the tank, as illustrated in FIGS. 4B and 4C. The baffle section 70, in one embodiment, is generally cylindrical to match the cylindrical shape of port pipe section 66. Furthermore, a cylindrical discharge pipe section 67 may be bolted or otherwise affixed to the port pipe section 66. The baffle section 70 incorporates a plurality of baffle walls 80, 82 in the baffle section 70 adjacent the trough portion 74 for blocking the flow of material from interfering with feed valve 72 (See FIG. 4D).

Referring to FIGS. 4A-4D, one embodiment of the invention incorporates a butterfly valve as the feed valve 72. A butterfly valve incorporates a rotating disk 84 that is rotated on a shaft 86, turned by an actuator mechanism 88. As illustrated in FIG. 4A, when the disk is generally perpendicular to the flow direction of the materials indicated by arrow 90 in FIG. 4A, the material is blocked, as shown in FIG. 4C. For example, the gravity flow of feed 92 contained inside the tank 12 is blocked. The baffle walls 80, 82 of baffle section 70 prevent the flow of material 92 into certain areas of the baffle section 70, thus, creating an open space 94 to allow rotation of disk 84, as shown in FIG. 4C. To provide a bulk flow of the feed 92 from tank 12 and through the bulk discharge port 62, disk 84 is rotated by the actuation of the actuator 88. Generally, the disk is turned essentially 90° to be oriented in a plane generally parallel to the flow direction 90, as illustrated in FIG. 4B. In that way, the feed 92 that is captured by trough portion 74 of the baffle section flows through the feed valve 72, through the bulk discharge port 62, and then ultimately through the discharge pipe section 67, and on to a ground surface. Referring to FIG. 4B, the open area 94 created by the baffle walls 80, 82 of baffle section 70, provides an area for a portion of the valve disk 84 to freely rotate such that the feed valve 72 is not operating against the feed material 92 to open. In that way, the feed 92 does not hinder the operation of the feed valve, and a smooth flow of feed may be accomplished when desired. Generally, the disk 84 or other actuated element of the feed valve 72 has a shape that matches the cross-sectional shape of the baffle section 70, and the pipe section 66 of the dump port 62 in order to completely seal the baffle section and dump port when the feed valve is closed, as illustrated in FIGS. 4A and 4C. In one embodiment of the invention as illustrated in the figures, the baffle section, dump port 62, and discharge pipe section 67 are cylindrical in shape, and thus, have a circular cross-section. In that regard, the disk 84 is a circular disk, and may freely rotate for opening and closing the feed valve.

Once a sufficient amount of feed has been dispensed from the bulk dump system, the feed valve may be closed, as shown in FIG. 4C, to stop the flow of bulk feed material. As may be appreciated, the various baffle section 70, port pipe section 66, and discharge pipe section 67 of the disclosed embodiment might be appropriately coupled together, such as with suitable flanges 100 and bolts or other fasteners 102. Alternatively, the various sections defining the bulk dump system 60 might be fabricated as a single element.

As illustrated in FIGS. 4A-4D, baffle section 70 and port pipe section 66 are oriented generally at an angle with respect to a vertical wall section 64 of tank 12. The trough portion or trough 74, as illustrated in FIGS. 4B-4C, captures feed 92 that is gravity fed toward the bottom 19 of the tank 12. In that way, the feed is available for bulk dumping or spreader discharge, in accordance with one aspect of the invention. The bulk discharge port 62, which may be defined by a pipe section 66, has a portion that extends outside of the tank, as illustrated in FIGS. 4A-4C, and a portion that extends inside the tank for positioning of the baffle section 70. As may be appreciated, the length of the pipe elements or sections that define the dump port 62 may have variable lengths and angular orientations with respect to the wall 64 of tank 12. Preferably, the port pipe section 62 and baffle portion 70 are angled so as to create a sufficient gravity flow of feed for the purposes of the bulk dump system 60 of the invention. As long as feed remains above the trough or trough portion 74, feed may be directed to the baffle section 70, and then through port 62, and into the discharge pipe section 67.

Figure 3:
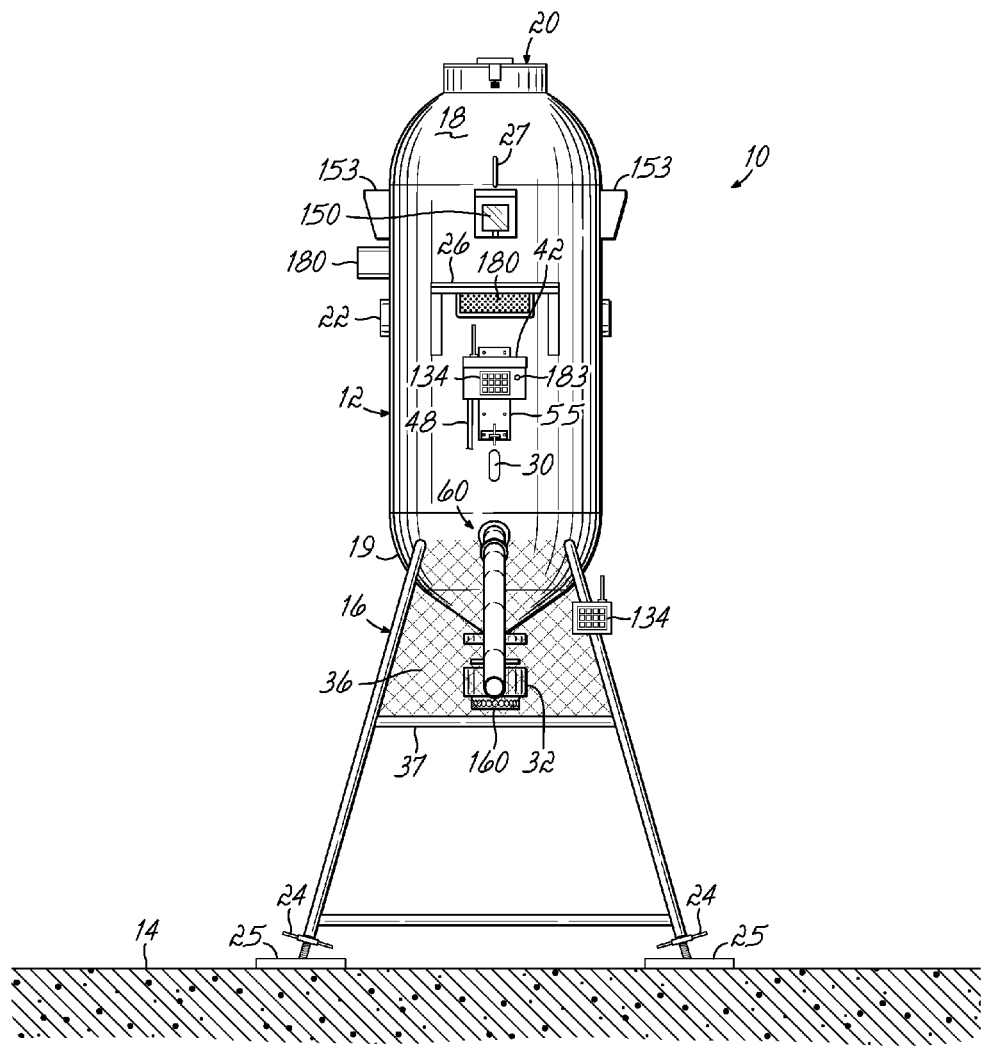
FIG. 3 is a front view of an embodiment of the feeder system of the invention.

Therefore, as illustrated in FIGS. 1-3, the present invention provides multiple ways of distributing feed, including both the traditional spreader to create a spread pattern 110, as shown in FIGS. 2 and 3, or to create a more dense pile of feed 112, as illustrated in FIGS. 1-3. Late in the season, and generally in the winter months, deer, as well as other animals readily come to a pile of feed 112. Therefore, the present invention provides a feeder system 10 that can adapt to use in a large number of different months and for different feeding patterns for animals, such as deer. The invention, therefore, provides a long-term feed system suitable for feeding and attracting animals throughout the different months of the season, such as a long hunting season, and particularly adapts to feeding patterns often adopted late in the season, and during cold winter months. Furthermore, the invention allows a large quantity of food to be delivered without using large amounts of battery power. In winter months, with shorter daylight periods, the sun is less direct on solar panels and weather is often overcast, and so energy consumption is an issue. Furthermore, dumping large amounts of feed by constantly running a spreader not only uses more energy but also wears out the components more quickly.

In accordance with another embodiment of the invention as illustrated in FIG. 5, the feed valve 72 might utilize a gate valve that includes a gate element 120 moved in the direction of arrow 122 by a suitable actuator mechanism 124. As illustrated, the gate valve may be opened and closed in a guillotine fashion for starting and stopping the bulk flow of feed, in accordance with the bulk dump system 60 of the invention.

Figure 5A:
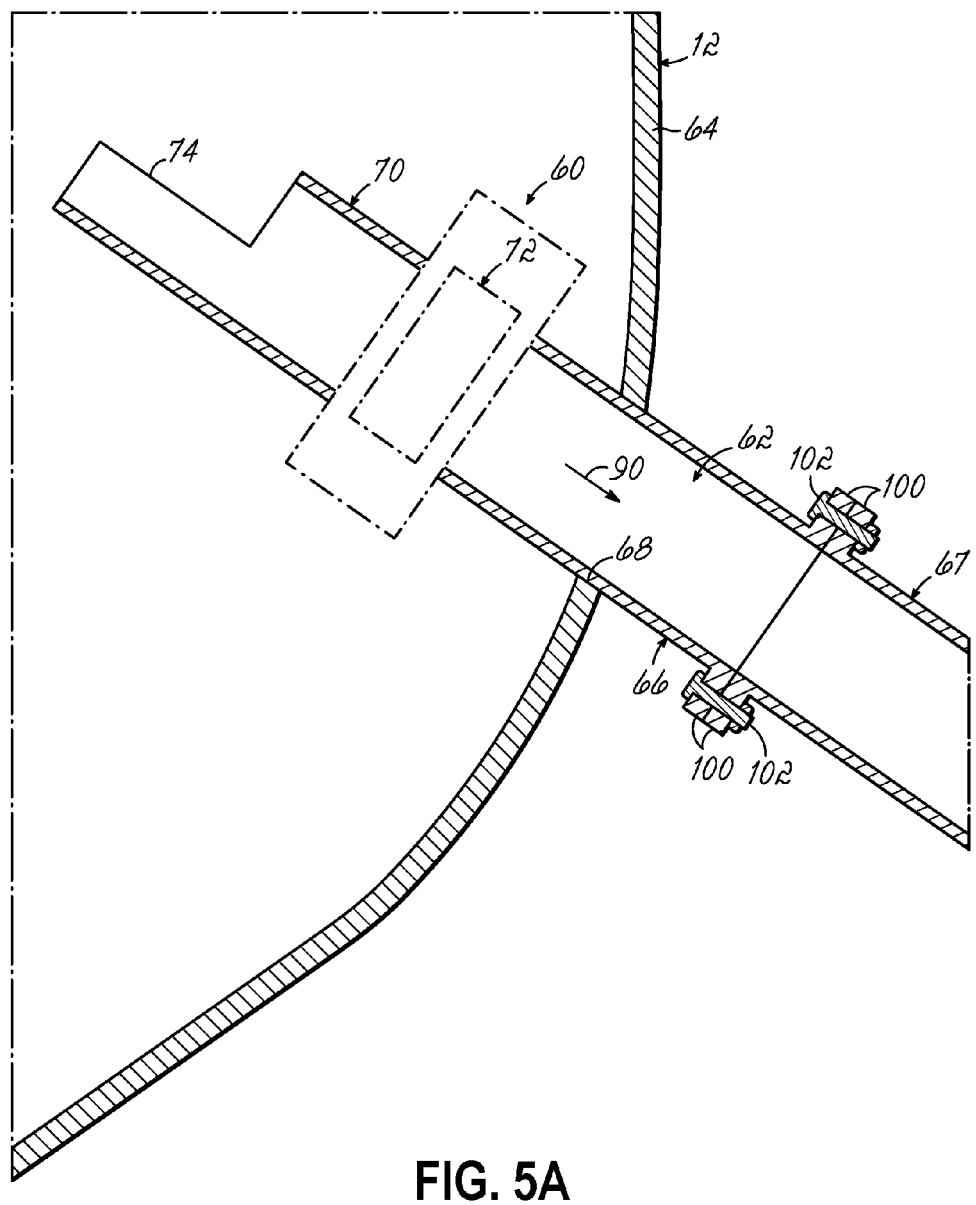
FIG. 5A is a cross-sectional view of another embodiment of the invention illustrating a discharge port incorporating another feed valve.

FIG. 5A illustrates another embodiment of the invention, wherein the bulk dump system 60 incorporates another feed valve 72. In accordance with one embodiment of the invention, a control ball valve 72 might be implemented that includes a rotating ball structure, with various inlet and outlet ports that may be rotated for starting and stopping the bulk flow of feed. In another embodiment of the invention, a constriction valve might be implemented that has a lining or membrane that may be selectively constricted and opened for the purposes of providing a bulk flow of feed. All such valves might be controlled electronically, as noted, through various control electronics 130, as disclosed herein.

While the illustrated embodiments show the bulk dump system and particularly the feed valve element positioned generally above the spreader mechanism, it might be positioned in other places in the tank, such as proximate the bottom end of the tank proximate the spreader mechanism. Therefore the present invention is not limited to the relative positions of the spreader mechanism and/or bulk dump system.

Figure 6:
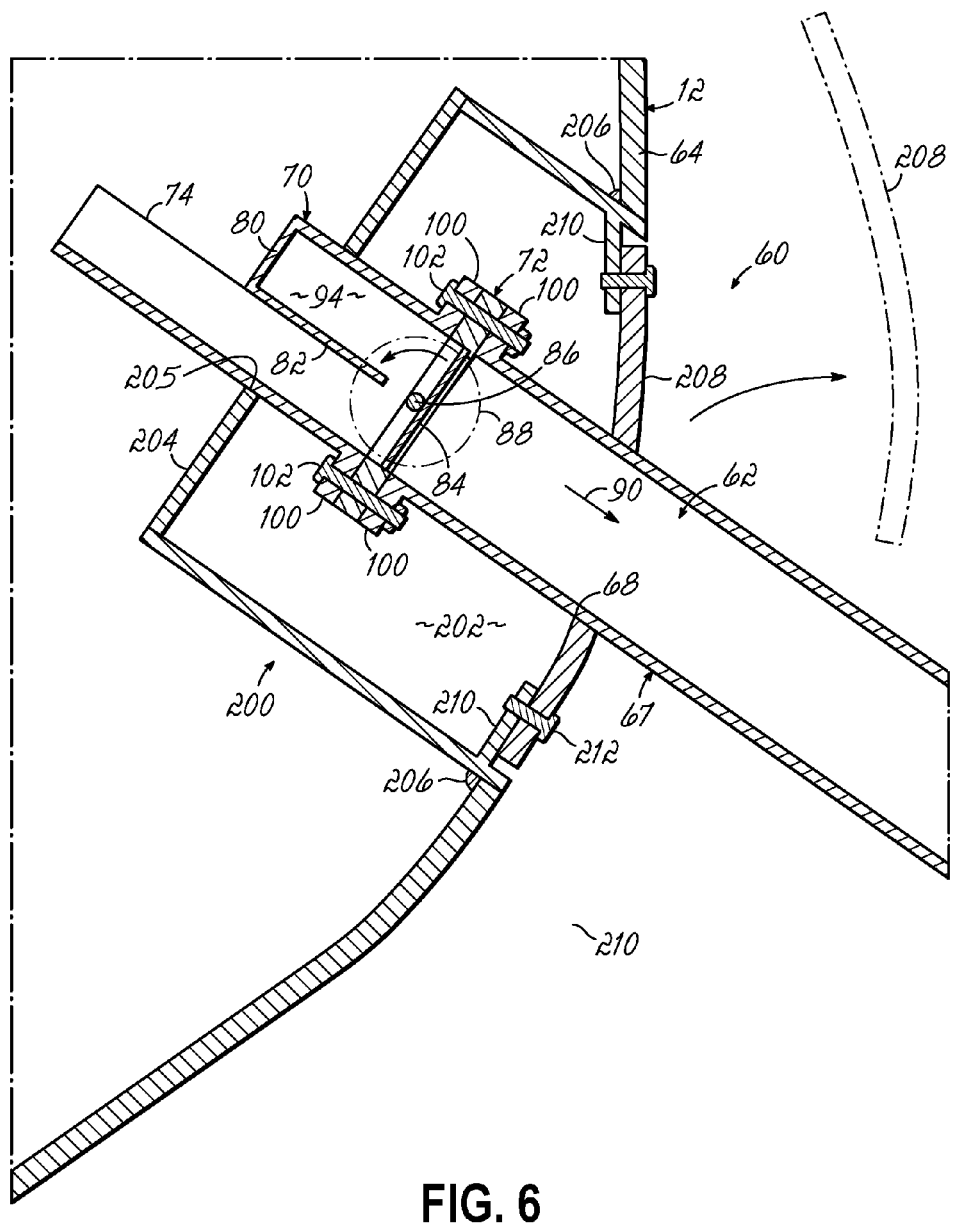
FIG. 6 is a cross-sectional view of another embodiment of the invention illustrating a discharge port incorporating another feed valve of the invention.

FIG. 6 illustrates an alternative embodiment of the feed system 10 of the invention, wherein the bulk dump system 60, and particularly, feed valve element 72, might be accessible from the exterior of the tank 12. More specifically, an indent section 200 is formed in the tank to create an accessible space 202 at the location of the bulk dump system 60 and feed valve 72. In one embodiment, suitable walls are formed and coupled with the tank 12, such as by welds 206 to form the indent section 200 and space 202. The walls 204 might be similar in construction and thickness to the walls of tank 12. The trough 74 passes through an opening or aperture 205 in the wall 204 for capturing feed to be dumped. In one embodiment of the invention, a section of the wall of tank 12 is removed. Referring to FIG. 6, section 208 might be removed by cutting it away from the wall of tank 12. The removal of section 208 of the wall 64 provides access to space 202 and to any feed valve elements 72, including wiring located within the tank, and particularly, located within space 202. In that way, the bulk dump system 60 may be repaired and/or replaced as desired, without having to crawl inside of tank 12. This presents a significant time savings, while also providing protection of the bulk dump system 60 and its elements within tank 12. Furthermore, as illustrated in FIG. 6, the discharge pipe 67 might be coupled directly to the baffle section 70, as illustrated in FIG. 6 since that baffle, the valve 72, and other components of the bulk feed system 60 are accessible from the exterior of the tank.

In one embodiment of the invention, the removed section 208 might also be replaced to provide further protection of the bulk feed system 60 and its components. In one embodiment the indent section 200 is formed to include a flange 210 that is positioned proximate the opening of the indent section. As shown in FIG. 6, section 208 might then attached to the flange 210 at various points around the indent section using appropriate removable fasteners, such as bolts 212. As may be appreciated, a suitable opening or aperture 68 would be formed in section 208 so that the discharge pipe 67 may pass therethrough, as illustrated in FIG. 6. The attachment flange 210 located in the indent section ensures that any moisture that passes through holes for the bolts 212 does not seep into the tank.

Figure 9:
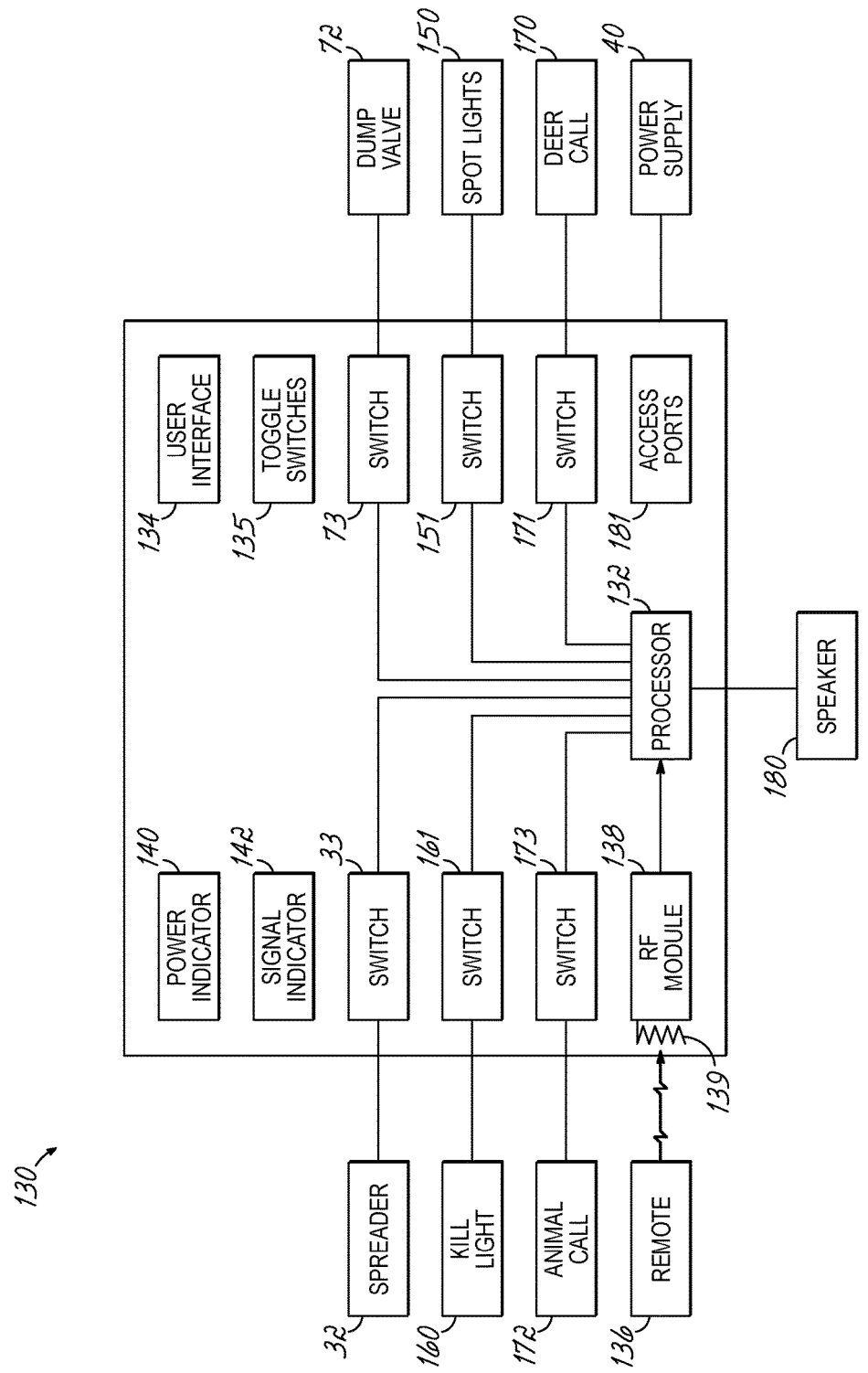
FIG. 9 is a schematic view of control electronics for an embodiment of the feed system of the invention.

In accordance with another aspect of the invention, feed system 10 includes additional features, which may be implemented for using the various features of the system and for implementing it within a hunting scenario. Specifically, the system includes control electronics 130, as illustrated in FIG. 9. The control electronics provide manual control, timed control and/or remote control of the various features and elements of the feeder system. Such control electronics might be incorporated within the housing 42, as illustrated in FIG. 1, and co-located with the power source, such as a battery, although that is not required. Control electronics 130 incorporate suitable processing electronics, such as a processor 132, that might be appropriately coupled with a user interface 134, such as push buttons, toggle switches, and/or a touch screen, for programming the system and activating various of the functions of the feeder system 10, as discussed herein. Generally such control electronics may also incorporate memory (not shown), either stand alone or part of processor 132, as needed for specific operation of the control electronics and noted herein.

The user interface 134 for programming and/or controlling the feeder system might be implemented in a variety of different locations, as illustrated in the figures. For example, as shown in FIG. 3, the user interface might be positioned on the frame structure 16, and accessible at ground level. Alternatively, as illustrated in FIG. 4, the user interface 134 might be mounted upon housing 42 that contains a battery 40, and possibly other control electronics 130. Of course, the present invention is not limited to the location of user interface 134 or housing 42 and other components. The user interface provides the ability to program the control and operation of the control electronics and the overall operation of the system and its features. For example, the specific timing control (time of day, operational time, etc) for the spreader mechanism or bulk dump system might be programmed. Also various elements such as lights and call devices might be programmed to operate at certain times. Alternatively, the user interface provides manual control and switching of various of the features of the invention to provide manual control separate from a programmed, timed control of features of the feeder system 10. For example, it may be desirable to override the timed programming of the spreader and/or bulk dump system and just provide feed discharge at a certain selected time. Alternatively, it may be desirable to turn the lights ON/OFF or the animal call devices ON/OFF as desired.

Alternatively, the control electronics might provide remote control of the feeder system. Specifically, the processor 132 might be coupled to a remote control device 136, through an appropriate RF module 138 and antenna 139. Processor 132 is programmed and configured with appropriate software for activating the various features of the invention, including spreader mechanism 32, the bulk dump system 60, and various visual and audio features of the invention. The control electronics 130 are coupled to an appropriate power supply, such as a battery 40 for operation. The remote control provides the ability to program the processor 132 for operation of the system or to manually operate one or more features of the feeder system 10.

As noted, processor 132 may be appropriately programmed for running the spreader mechanism 32 through the control of one or more switches 33. The processor may control the specific time that the spreader mechanism is operated (i.e., turned ON and OFF) and thus, define the time interval that it operates to spread feed. This, in turn, defines the amount of feed dispensed. Furthermore, processor 132 may determine the time of day, and the frequency in which the spreader mechanism 32 is operated. That is, the spreader mechanism might be operated in the morning, and then again in the evening, to coincide with hunting. Similarly, processor 132 might control the bulk dump system 60 by controlling the operation of the feed valve or dump valve 72, through one or more appropriate switches 73. Similarly, the processor might control the time at which the feed valve 72 is opened and closed to dump feed in bulk, the duration that it is open, and the frequency during the day in which it is operated. For example, it may only be desirable to operate the feed valve a single time each day to provide a single pile of feed, as shown in FIG. 2. As may be appreciated, the user interface 134 or remote control 136 may be implemented to select certain operating parameters of processor 132, such as the time of the spreader and feed valve operation, the duration of such operation, and the frequency of operation during the course of a day. As such, the user interface 134 and remote control 136 may be utilized to program or specifically select various of the operational features of the control electronics 130 and the operational systems and devices of feeder system 10.

The control electronics 130 might include one or more indicator lights, such as a power indicator 140, indicating that power supply 40 is providing sufficient power. Additionally, one or more signal indicators 142 might be utilized for indicating that a particular feature of the control electronics is operating. For example, the signal indicator 142 might provide an indication that the remote control 136 is communicating with the RF module 138 of the control electronics.

While the various operational features of system 10 might be operated appropriately through processor 132 based on timing or based upon a remote control, the control electronics 130 might also incorporate one or more appropriate switches, such as toggle switches 135, as illustrated in FIG. 9. The toggle switches 135 might be implemented as part of a user interface 134, or may be standalone switches mounted proximate the user interface. In either scenario, the toggle switches would allow for a user to selectively turn ON or OFF one of the features controlled by the control electronics 130. Such manual control would then allow a user selectivity in the use of the feature, without relying upon timing or other control provided through processor 132. For example, if a user wants to provide a bulk dump, they might incorporate a toggle switch 135, or some other toggle switch feature provided through user interface 134, in order to control dump valve 72. Similarly, the spreader 32, or various lights 150, 160, might also be controlled selectively by user with an ON/OFF toggle switch. In that way, the inventive system provides various ways to control the various features of the feeder system, such as through processor 132, through a remote control 136, through one or more manual switches 135, or switches provided through user interface 134. The user can then use the feature of the feeder system without requiring reprogramming of the processor or use of a remote control device.

Figure 2A:
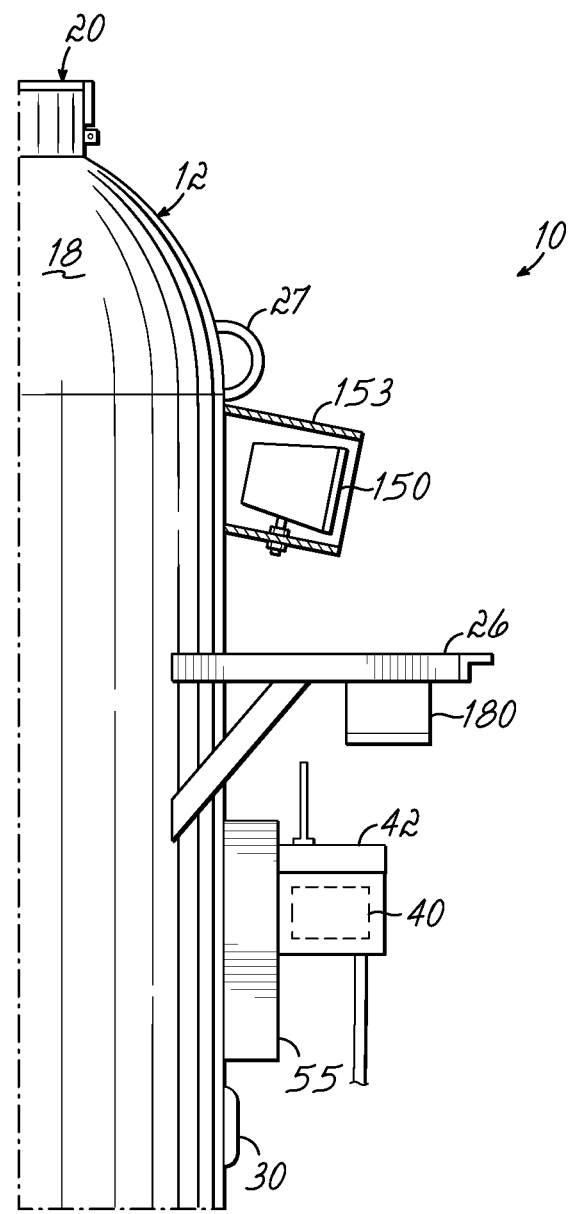
FIG. 2A is a sectional side view of an embodiment of the feeder system of the invention showing a spotlight encased in a protective sleeve.

In accordance with another embodiment of the invention, feeder system 10 incorporates one or more light devices that may be implemented for various purposes. For example, feeder system 10 utilizes one or more spotlights 150 that may be operated through one or more appropriate switches 151. Referring to FIG. 1, the spotlights 150 might be positioned on tank 12 to light up an area around the feeder system 10, as desired. To that end, various spotlights might be positioned around the perimeter of the tank for lighting up an area around the tank, such as to show activity around the feeder system when it is dark. In the drawings, a light 150 is positioned at 90° intervals, around the tank. The spotlights 150 may be any suitable light, including LED lights. One suitable spotlight might be an LED spotlight, as illustrated in FIG. 2A. The LED light elements 150 might be encased within a protective sleeve or tube 153 positioned at various locations around the tank 12. In that way, the lights are protected from falling objects, such as branches.

The feeder system might incorporate one or more kill lights 160 that would be appropriately controlled by processor 132. Such kill lights emit light in a particular wavelength, which does not bother nearby animals, such as a green light or red light. Such a light may provide a visual indication of animals in the area of the feeder, without disturbing those animals. As illustrated in FIGS. 1-4, one appropriate position for the kill light is mounted directly to spreader mechanism 32. Of course, the kill light 160 might be located in other positions on the tank. The various lights 150, 160 might be operated utilizing remote control 136. In that way, processor 132 might operate the lights through appropriate switches 151, 161. Alternatively, the process might control the lights to turn ON at certain times of day, or when ambient light is low. To that end, the control electronics might incorporate a light sensor (not shown).

In accordance with another aspect of the invention, the feeder system 10 incorporates one or more animal calls or call devices 170, 172 that may be activated utilizing either the user interface 134 or a remote control 136. Such call devices might be activated to draw animals closer to the location of the feeder system 10. For example, one or more dedicated deer call/sound devices might be utilized and controlled through processor 132, and appropriate switches. Referring to FIG. 9, a deer call device 170, as shown, may be activated through processor 132 and switch 171. The deer call device may be dedicated and specifically programmed for providing a series of calls or sounds, such as a deer bleat, or a deer grunt. Alternatively, a plurality of various deer call devices 170 might be used, each providing a separate particular call. Similarly, one or more other animal call devices 172 might be implemented and controlled through processor 132 and appropriate switch or switch circuitry 173. For example, animal call devices(s) 172 might provide one or more dedicated predator calls/sounds, such as for attracting coyotes or other predators for hunting purposes. Usually such sounds include struggling prey animal sounds, young predator sounds or other attractant sounds for attracting a predator. Another use for predator call devices might be to push deer away from system 10, if you want to come down from a deer stand in the evening, without spooking the deer by your scent and movement. A user of the feeder system of the invention, such as a hunter, might be located proximate to the feeder system. Utilizing a remote control 136, the user might activate one or more of the deer or animal call devices 170, 172 to attract deer, coyotes, or other animals to the feeder system, or to push animals away. Such call devices may be positioned appropriately on the system 10.

In an alternative embodiment of the invention, the animal call devices and features of the system 10 might be implemented through processor 132. In referring to FIG. 1, one or more speakers 180 might be implemented on the feeder system. The speaker(s) may be appropriately coupled to processor 132, which is configured to store one or more audio files directed to various animal calls and/or sounds, such as deer sounds, coyote sounds, or prey sounds. The control electronics 130 and processor 132 might be appropriately operated to play or broadcast the animal sounds through speaker 180. Appropriate animal sounds, such as deer sounds, might be stored in various audio file formats, and then played through processor 132 to be broadcast by speaker 180. The remote control 136 might be utilized to select one or more of the various sounds and audio files for playback. Speaker 180 then broadcasts those sounds to be heard by animals to provide further call scenarios in addition to those provided by the mechanisms 170 and 172. Therefore, the animal call device might be appropriately supplied by the processor 132 and speaker 180 rather than a stand alone device.

In accordance with another aspect of the invention, system 10 includes one or more accessory ports 181 for plugging in one or more accessories to be powered by the power supply 40 of the system. For example, an accessory port may be provided to power a trail camera. Referring to FIG. 7, the trail camera 190 might be mounted to a support, such as a tree 191, and powered directly through a cable 192 that is coupled to housing 42 and a suitable power supply, such as a battery. The camera could be powered by a direct connection to the power supply or by being plugged into an accessory port 181. Cable 192, similar to cable 48, would also be constructed so as to prevent damage from animals, such as squirrels. In that way, pictures of animals near the feeder might be provided by camera 190 that is powered by a battery 42, and by one or more suitable solar panels.

In another embodiment invention, on or more accessory ports or charging power ports may be available to serve various purposes, such as for powering different devices. In one embodiment, an accessory port 181 is coupled to the power supply, such as a battery and might include a 12-Volt lighter power port 183 positioned in housing 42, as illustrated in FIGS. 3 and 4. The accessory port 181 might also be in the form of an AC plug for powering one or more devices. Such a port may be utilized to power one or more personal electronic devices, such as a cell phone, or might be used to power heated clothing like a heated hunting jacket. For example, a cable might be run from a tree stand used by a hunter with heated apparel and coupled to port 183 for powering the apparel. The accessory ports 181 may be incorporated with suitable power conversion electronics, such as to provide AC power or DC power or a particular voltage level, as desired, for the power delivered to the accessory reports 181. In that way, various different ports, depending upon their power needs, may be coupled with the power supply 40 of system 10.

Other modifications will be apparent to one of ordinary skill in the art. Therefore, the invention lies in the claims hereinafter appended. Furthermore, while embodiments of the invention has been illustrated by a description of the various embodiments and the examples, and while these embodiments have been described in considerable detail, it is not the intention of the applicants to restrict or in any way limit the scope of the appended claims to such detail.

Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. An animal feeder system for dispensing feed onto a ground surface, the feeder system comprising:
   a tank configured for holding feed and having a bottom end for receiving a gravity flow of feed in the tank;
   a power source;
   a spreader mechanism operably coupled with the bottom end of the tank, the spreader mechanism operable to receive feed from the gravity flow of feed from the bottom end of the tank and having a rotating mechanism configured to periodically spread and dispense the feed onto a ground surface proximate the tank;
   a bulk dump system including:
   a discharge port positioned in a wall of the tank, the discharge port configured for capturing at least some of the feed in the gravity flow of feed;
   a feed valve coupled with the discharge port and selectively operable for dispensing the captured feed from the discharge port into a pile on the ground surface.

2. The animal feeder system of claim 1 further comprising a baffle positioned inside the tank proximate the bottom end, the baffle positioned above the spreader mechanism for diverting the feed from flowing directly onto the spreader mechanism.

3. The animal feeder system of claim 1 further comprising:
   a rechargeable power source;
   at least one solar element for capturing sunlight and providing power to recharge the rechargeable power source.

4. The animal feeder system of claim 3 further comprising an extendable arm coupled with the tank and configured for supporting the solar element at a position spaced from the tank wherein the extendable arm is one of an articulating arm or telescoping arm.

5. The animal feeder system of claim 1 further comprising an accessory port configured for supplying power to a powered accessory that is connected to the feeder.

6. The animal feeder system of claim 1 further comprising a lifting structure extending through the tank, the lifting structure including a tubular structure.

7. The animal feeder system of claim 1 further comprising one or more animal call devices, the animal call devices coupled with the power source for providing animal calls proximate the feeder.

8. The animal feeder system of claim 7 wherein the animal call devices are configured to generate at least one of deer calls or predator calls.

9. The animal feeder system of claim 1 further comprising one or more light devices coupled to the power source for providing light proximate the animal feeder system.

10. The animal feeder system of claim 9 wherein the one or more light devices includes at least one of spotlight or a light that emits in a wavelength that does not disturb an animal.

11. An animal feeder system for dispensing feed onto a ground surface, the feeder system comprising:
    a tank configured for holding feed and having a bottom end for receiving a gravity flow of feed in the tank;
    a power source;
    a spreader mechanism operably coupled with the bottom end of the tank, the spreader mechanism operable to receive feed from the gravity flow of feed from the bottom end of the tank and having a rotating mechanism configured to periodically dispense the feed onto a ground surface proximate the tank;
    a bulk dump system including:
    a discharge port positioned in a wall of the tank, the discharge port configured for capturing at least some of the feed in the gravity flow of feed;
    a feed valve coupled with the discharge port and selectively operable for dispensing the captured feed from the discharge port into a pile on the ground surface;
    one or more animal call devices coupled with the power source for providing animal calls proximate the feeder;
    one or more light devices coupled to the power source for providing light proximate the animal feeder system;
    control electronics coupled with the power source, spreader mechanism, bulk dumping system, animal call devices, and light devices for controlling the operation of the feeder system.

12. The animal feeder system of claim 11 wherein the control electronics provide at least one of manual, programmed or remote control of the feeder system.

13. The animal feeder system of claim 11 further comprising an accessory port configured for supplying power to a powered accessory that is connected to the feeder.

14. The animal feeder system of claim 11 further comprising a lifting structure extending through the tank, the lifting structure including a tubular structure.

15. An animal feeder system for dispensing feed onto a ground surface, the feeder system comprising:
    a tank configured for holding feed and having a bottom end for receiving a gravity flow of feed in the tank;
    a power source;
    a spreader mechanism operably coupled with the bottom end of the tank, the spreader mechanism operable to receive feed from the gravity flow of feed from the bottom end of the tank and having a rotating mechanism configured to periodically dispense the feed onto a ground surface proximate the tank;
    a bulk dump system including:
    a discharge port positioned in a wall of the tank, the discharge port configured for capturing at least some of the feed in the gravity flow of feed;
    a feed valve coupled with the discharge port and selectively operable for dispensing the captured feed from the discharge port into a pile on the ground surface;
    one or more animal call devices coupled with the power source for providing animal calls proximate the feeder;
    control electronics coupled with the power source, spreader mechanism, bulk dumping system, and animal call devices for controlling the operation of the feeder system.

16. The feeder system of claim 15 wherein the one or more animal call devices include a dedicated device for providing a particular animal call.

17. The feeder system of claim 15 wherein the one or more animal call devices includes a processor configured to store one or more audio files directed to animal sounds and one or more speakers for playing the animal sounds from the feeder system.

18. The feeder system of claim 15 wherein the one or more animal call devices is capable of providing at least one of deer sounds and predator sounds.

19. The animal feeder system of claim 15 further comprising one or more light devices coupled to the power source for providing light proximate the animal feeder system.

\* \* \* \* \*